Y. OGAWA.
SPEED REDUCING GEAR ARRANGEMENT FOR STEAM TURBINES.
APPLICATION FILED JAN. 11, 1917.
1,253,710. Patented Jan. 15, 1918.
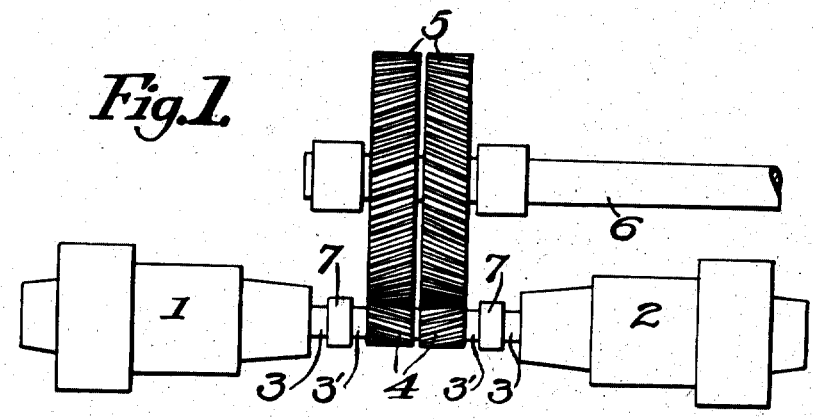
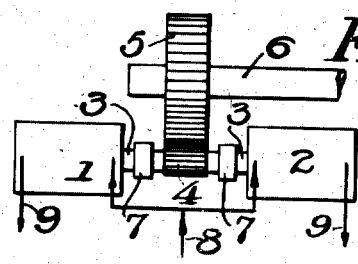
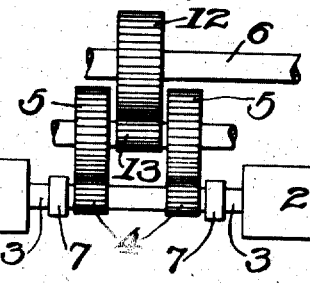
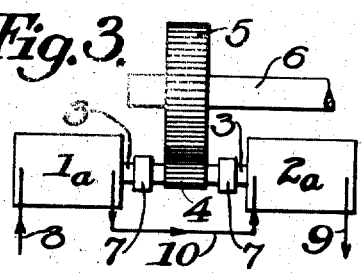
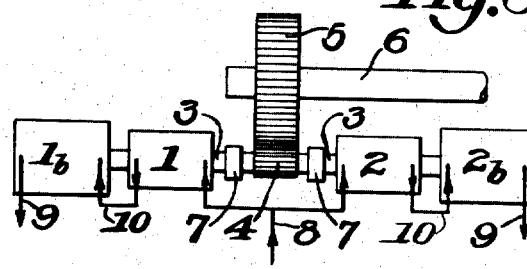
Inventor
Yeitaro Ogawa
Attorney

UNITED STATES PATENT OFFICE.

YEITARO OGAWA, OF KUSUNOKI MACHI, KOBE, JAPAN.

SPEED-REDUCING GEAR ARRANGEMENT FOR STEAM-TURBINES.

1,253,710. Specification of Letters Patent. Patented Jan. 15, 1918.

Application filed January 11, 1917. Serial No. 141,791.

*To all whom it may concern:*

Be it known that I, YEITARO OGAWA, subject of Japan, residing at No. 4, lot 79, Shichi-chome, Kusunoki Machi, Kobe, Japan, have invented new and useful Improvements in Speed-Reducing Gear Arrangements for Steam-Turbines, of which the following is a specification.

This invention relates to speed-reducing gear arrangement for steam turbines, wherein a pair of steam turbines rotating at the same speed are fixed to a common main shaft, and a driving pinion is mounted on said main shaft between the said turbines in such a way that the said driving pinion shall gear with a driven wheel either directly or through intermediate shaft, so that the driving pinion may receive an equal revolving force from both sides. The object of this invention is to reduce the torsion and bending of the main shaft and to make such torsion and bending equal on both sides of the driving pinion whatever the load or speed may be, in order that the driving pinion might always gear with the driven wheel exactly without being affected by the said torsion or bending and that the pressure on the teeth might be uniformly distributed along the whole width of the teeth.

Figure 1 is a plan of this invention, while Figs. 2 to 5 diagrammatically show a few applications of the invention to turbine arrangement. In all the figures the same or corresponding parts are referred to with the same numbers.

As may be seen from Fig. 1, this invention has two steam turbines 1 and 2 rotating at the same speed on a common shaft 3. On this shaft between the said turbines, a driving pinion 4 is mounted, and the driving pinion gears with a driven wheel 5, which drives a propeller or any other driven shaft 6. When desired, the main shaft 3 may be fitted with clutches 7 by which it can be connected to or disconnected from the shaft 3 of the driving pinion 4.

The speed-reducing gearing hitherto in use has only one steam turbine, and the driving pinion is mounted at one end of its shaft. But inasmuch as the driving pinion is driven from one side only, the power transmitted to the driven wheel is generally very great. Moreover, the main shaft being of comparatively a small diameter, any change in the load or the speed produces corresponding change in the torsion and bending thereof. The driving pinion thus influenced cannot always gear with the driven wheel exactly, and pinions and toothed wheels having generally broad but fine and delicate teeth, the pressure between the teeth caused by the power transmitted is not evenly brought to bear on the entire surface of the teeth. The result is partial wearing of the teeth, and consequently greater friction and less efficiency, and sometimes breaking of the wheels due to the shock produced on the teeth. The above has always been one of the worst difficulties one had to meet with in the steam turbine gearing, and a common method adopted to obtain exact gearing has been to provide a fine clearance between the teeth and to construct a special bearing of a complicated nature. In my invention however the driving pinion, as has been stated, is placed between two turbines rotating at the same speed and receives equal driving force from both sides. Consequently not only are the torsion and bending of the main shaft reduced but they are always equal on both sides whatever the load or the speed of rotation may be. Consequently the driving pinion is not affected by them in the least, but revolves exactly about the true axis, the gearing of the driving pinion with the driven wheel remains always unchanged, and the pressure on the teeth is distributed uniformly over the whole width of teeth. With my invention, therefore, neither the special shaft bearing nor the clearance between teeth are necessary, and as the teeth do not wear, the efficiency of the turbines is very high.

Since this invention consists, as we have seen, in moving the driving pinion by two turbines placed on either side thereof, it can be applied to various kinds of turbine arrangement, and Figs. 2 to 5 show some examples of its applications. In Fig. 2, two turbines 1 and 2 receive steam simultaneously through pipes 8 and exhaust it into a condenser or low pressure turbines or engines through pipes 9. Fig. 3 shows a set of compound type in which the steam first enters the high pressure turbine 1ª through pipe 8, then goes on to a low (or intermediate) pressure turbine 2ª through pipe 10 and finally passes into the condenser (or a lower pressure turbine or engine) through pipe 9. Fig. 4 shows an arrangement similar to Figs. 2 and 3, but fitted with a train of gearing. The driving pinions 4 on the main shaft move the driven wheels 5 on an intermediate shaft 11 while the pinion 13 on the intermediate shaft moves the wheel 12 mounted on the propeller shaft or the like. Fig. 5 represents the case in which more than two turbines are fixed to a common main shaft. The steam first enters two high pressure turbines 1 and 2, then goes on to low (or intermediate) pressure turbines 1$^b$ and 2$^b$ through pipes 10 and finally passes into condensers (or lower pressure turbines or engines) through pipes 9. The Figs. 2 to 5 show only a few examples of the application of my invention to turbine arrangement, and I hardly need to say that two or more sets of turbines may be made to gear with one and same driven wheel in accordance with my invention, as shown in the above examples, or it may be applied to other arrangements, and the two turbines on the same main shaft may be either simple or compound, main or cruising, ahead or astern, turbines.

Having thus described my invention, what I claim and desire to secure by Letters-Patent is:—

1. In a speed reducing gearing arrangement for steam turbines running at high speeds, the combination comprising a pair of turbines developing substantially constant torques and running at the same speed, a shaft common to said turbines, a driven shaft, a driving pinion mounted on the common shaft intermediate of the turbines and a gear wheel fixed to said driven shaft and arranged to mesh with said pinion.

2. In a speed reducing gearing arrangement for steam turbines the combination comprising a plurality of turbines adapted to rotate at equal speeds and arranged with their shafts axially in line, a pinion disposed between said turbines and arranged to rotate about the same axis as said shafts, a driven wheel in mesh with said pinion, and clutches adapted to connect said pinion with said shafts.

3. In a speed reducing gearing arrangement for steam turbines, a pair of turbines of equal power and adapted to rotate at equal speeds, a common shaft for said turbines, a pinion comparatively long as compared with its diameter fixed on the common shaft half way between the turbines, and a driven wheel arranged in mesh with said pinion.

YEITARO OGAWA.

Witnesses:
YASHIKA IKEDA,
TOMOJIRO KITAJIMA.